FROST ATTRACTOR FOR REFRIGERATORS

Original Filed May 2, 1955 3 Sheets-Sheet 1

Inventors
HARRY A. WHITESEL
WARREN R. BOWER by Hill, Sherman, Meroni, Gross & Simpson Attys.

FROST ATTRACTOR FOR REFRIGERATORS

Original Filed May 2, 1955 3 Sheets-Sheet 2

Inventors
HARRY A. WHITESEL
WARREN R. BOWER by Hill, Sherman, Meroni, Gross & Simpson Attys.

FROST ATTRACTOR FOR REFRIGERATORS

Original Filed May 2, 1955 3 Sheets-Sheet 3

Inventors
HARRY A. WHITESEL
WARREN R. BOWER
by Lilly, Sherman, Morris, Cross & Singer Attys.

United States Patent Office

Re. 24,782
Reissued Feb. 16, 1960

24,782

FROST ATTRACTOR FOR REFRIGERATORS

Harry A. Whitesel, Cedar Rapids, Iowa, and Warren R. Bower, St. Paul, Minn., assignors to Amana Refrigeration, Inc., Amana, Iowa, a corporation of Iowa Original No. 2,890,574, dated June 16, 1959, Serial No. 505,196, May 2, 1955. Application for reissue July 13, 1959, Serial No. 826,889

5 Claims. (Cl. 62—275)

Matter enclosed in heavy brackets [ ] appears in the original patent but forms no part of this reissue specification; matter printed in italics indicates the additions made by reissue.

The present invention relates to control apparatus for low temperature food freezers and the like. More particularly, it is concerned with the provision of a novel and greatly superior freezer defrosting system wherein the atmosphere within the freezer or food storage compartment is maintained at a temperature sufficiently low to prevent damage to stored frozen foods during the defrosting operation.

As those skilled in the refrigeration art are aware, the purchasing public has in the past few years become more and more conscious of the need for adequate defrosting for refrigerator units. Such defrosting apparatus has been desired in order to improve the overall efficiency of the refrigeration system, as well as to eliminate, wherever possible, the temporary shut down of the refrigeration apparatus for a thorough defrosting. In response to this demand, numerous refrigeration defrosting systems have been proposed and utilized in connection with conventional home type refrigerator units. However, such defrosting systems have, to our knowledge, been applied mainly to the refrigeration systems of the relatively high temperature type in which food or similar matter is to be stored at a temperature slightly above freezing and wherein additionally a small freezer compartment may be provided. Ordinarily, the temperature of such refrigerator units of the prior art ranges between 32° and 40° F. and it is not intended that the temperature drop below the freezing point such that food stored actually becomes frozen except in the limited freezer area.

To our knowledge, actual freezer cabinets of the type in which food is to be retained at temperatures substantially below freezing have in all cases lacked completely satisfactory defrosting control. Instead, instructions accompanying such low temperature freezer units suggest that from time to time the accumulated frost be scraped from the cold surfaces of the freezer unit by manual means. This suggested method is, of course, very unsatisfactory since it requires that the freezer door be left open for a substantial period of time during this manual defrosting operation, thereby permitting the temperature of the freezer unit to rise substantially. Further, the manual removal of accumulated frost and ice is a task generally considered disagreeable.

As an alternative possibility it has been suggested that defrosting systems of the type ordinarily used in the high temperature refrigeration systems above mentioned be utilized in low temperature freezers. Such a system would provide for heating, at spaced periods of time, the refrigeration coils of the freezer to permit melting of the frost collected thereon. Since the more efficient upright types of food freezers now marketed provide cooling coils forming a portion of the refrigeration evaporator underneath the food shelves and preferably in contact therewith, such a defrosting system would cause an increase in the temperature of the shelves as well as the evaporator coil. Although such a slight increase does not adversely affect food capable of storage in a high temperature refrigerator, it is extremely unsatisfactory in a low temperature freezer since frozen food that has been thawed even slightly cannot satisfactorily be refrozen.

Accordingly, it has been considered essential that any successful defrosting system for low temperature freezer units operate without the need for opening the freezer door and further without appreciably increasing the temperature of the stored frozen food. These two requirements have heretofore been unachieved. By the present invention, however, both of them have been incorporated to provide a low temperature freezer unit which may be auomatically defrosted at desired intervals without raising the temperature of the stored food materially, and in no case above 32° F.

In addition, by means of the apparatus constructed in accordance with the present invention frost is actually prevented from accumulation on the internal liner and shelves of the freezer during normal use. This is an extremely desirable feature since it permits the user to insert and remove packaged foods without displacing frost onto the adjacent floor area or onto the clothes, as so often occurs with prior art non-defrosting upright freezer units.

In accomplishing the above set forth desirable objectives, applicants have incorporated within an otherwise conventional low temperature freezer unit, a super-cooled frost attracting and defrosting surface hereinafter termed a frost attractor or secondary evaporator. Thus, for example, should it be desired that the overall temperature within the freezer unit be maintained at or about 0° F., the secondary, or super-cooled surface is cooled to an average temperature somewhat lower than the average temperature of the main cabinet cooling surfaces of the freezer hereinafter termed the primary evaporator.

As a result of this differential in temperature the primary evaporator coils are actually warmer than the surface of the secondary coils and, ordinarily, the air in the cabinet. Accordingly, there is a tendency for heat to be transferred from the primary to the secondary coils and it has been found that this transfer causes any frost accumulating on the primary coils to migrate to the secondary defrosting coils. Thus, even though continual opening of the freezer door may cause a slight accumulation of frost on the primary coils, operation of the freezer for a nominal period, such as over night, with the door closed will be sufficient to cause migration of all of the frost from the primary freezer surfaces to the secondary defroster coils.

A defrosting apparatus provided for the secondary or defroster coils and upon accumulation of frost may be energized to melt such collected frost rapidly for removal through a conventional drain.

Heat may be supplied to the secondary coils in various ways, including such apparatus as electrical heaters or reversing the refrigeration cycle. The localized heating or defrosting action at the defroster is, of course, insufficient to cause a general defrosting of the freezer area and accordingly neither the primary evaporator coils nor the food placed thereon ever attain a temperature in excess of freezing.

It is, therefore, an object of the present invention to provide a defrosting system for low temperature freezers or the like wherein the defrosting action may be achieved without the application of heat at the food storage shelves.

Another object of the present invention is to provide a defrosting system for low temperature freezers or the like wherein accumulations of frost on the primary evaporator coils is prevented at all times during normal use.

Still a further object of the present invention is to provide a dual cooling coil refrigeration system for a low temperature food freezer or the like wherein one of the coils provides below-freezing food storage temperatures all times and the remaining coil simultaneously aids in the reduction of the freezer temperature and accumulates all frost deposits.

Yet another object of the invention is to provide a simple defrosting system for low temperature food freezers wherein food spoilage resulting from intermittent overheating is entirely eliminated.

Another object of the present invention is to provide an effective defrosting system for low temperature food freezers or the like which completely eliminates manual defrosting.

A feature of the invention is the provision of a separate, relatively remotely positioned, secondary evaporator coil cooled to an average temperature below that of the primary food storage cooling evaporator surfaces.

Another feature of the invention resides in the provision of a super cooled frost attracting surface for food freezers or the like and positioned at a point within said freezer away from the food or other material stored therein.

Yet another object of the invention is to provide a frost attractor for refrigeration systems of high or low temperature types whereby the primary cooling surfaces of the systems need never be defrosted and yet are always frost free.

Still other and further objects and features of the present invention will at once become apparent to those skilled in the art from a consideration of the attached sheet of drawings wherein preferred embodiments of the invention are shown by way of illustration only, and wherein.

As shown on the drawings.

For purposes of illustration, the present invention is shown in association with an upright type of low temperature freezer wherein food holding shelves are horizontally disposed. It will, however, be understood that the invention is equally well useable with chest type freezers or any other similar cabinet type enclosure. With this in mind, attention is drawn to Figure 1 wherein a cabinet 10 provided with legs 11 and shelves 12. All of generally conventional nature, is shown. As in the case of food freezers of the known prior art, the cooling coils of the evaporator of the refrigeration system, hereinafter called the primary coils, surround the walls 13, 14, 15 and 16 of the cabinet and also preferably extend underneath and in contact with the shelves 12.

Figure 1:
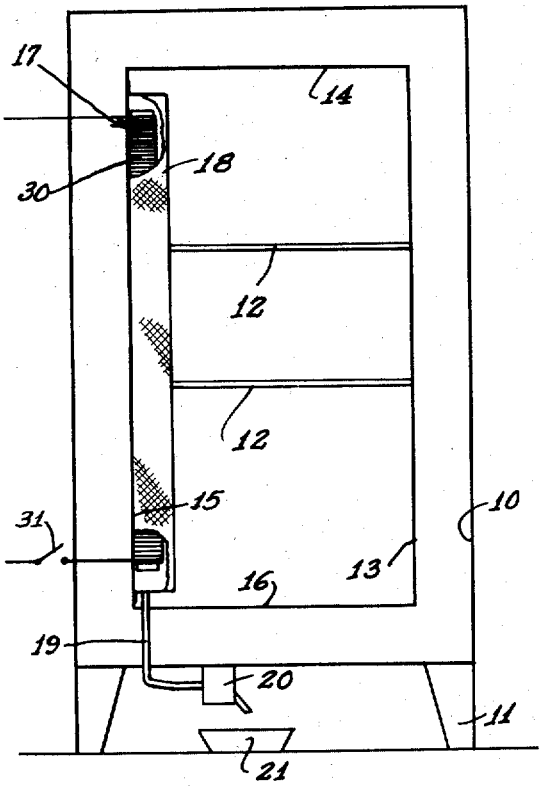
Figure 1 is a diagrammatic view of a food freezer or the like incorporating the instant invention.
Figure 6:
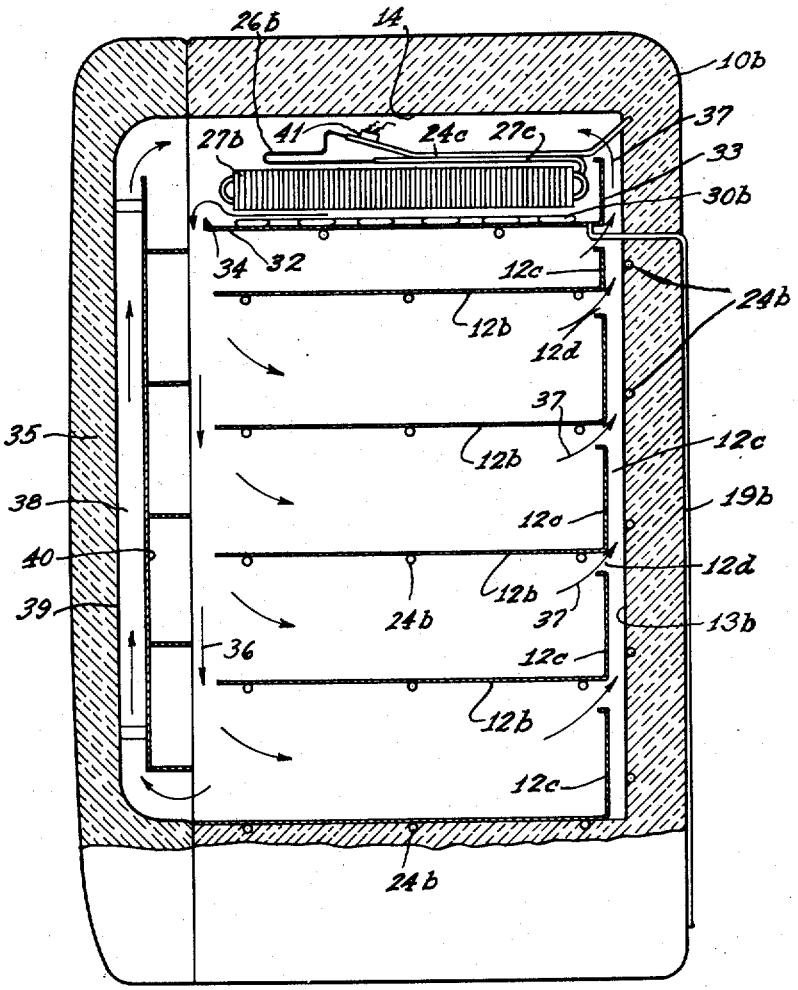
Figure 6 is a diagrammatic showing of a freezer cabinet using a modified form of the invention and illustrating air circulation therein.

As will be described more fully below, a frost attracting, defroster, device 17 is provided in the refrigeration circuit and may be positioned, as shown in Figure 1, along the side wall of the freezer removed from usual storage area or alternatively the frost attractor may be positioned near the top surface 14, as shown in Figure 6. In either type of installation, a perforated guard enclosure 18 is preferably provided to prevent undesired contact of food packages with the frost attractor coils and to prevent the heat given off by the frost attractor during defrosting operation from effecting nearby packages. As in the case of conventional defrosting systems, a drain 19 is provided for directing the defrost water to a check valve 20 for discharge into an evaporating drip pan 21.

As above explained the basic principle of operation of the frost attractor of the present invention is that the shelves 12 as well as the side wall of the freezer, operate at an average temperature higher than the average temperature of the frost attractor device. Thus, although both the shelves, or primary cooling surfaces, and the frost attractor, or secondary cooling surface, operate to provide a compartment substantially colder than the room temperature, a temperature differential is simultaneously maintained between the frost attractor and the remainder of the freezer.

In ordinary operation, the temperatures above mentioned relative to the temperature differential, will be such that the freezer cabinet and shelves operate at a dry bulb temperature which is above both the dry bulb and dew point temperatures of the air in the freezer cabinet. However the transfer of frost from a shelf or the like in the freezer compartment to the frost attractor depends upon the dry bulb temperature of the shelf or primary evaporator surfaces, and the dew point temperature of the air there adjacent. Thus, it is possible to transfer frost from the primary evaporator surfaces or the food cooled thereby, to the air when the dry bulb temperature of the air is slightly higher than the temperature of the shelves, as long as the dew point temperature of the air is actually lower. Since the dew point temperature of the air is usually somewhat lower, and never can be higher, than the dry bulb temperature of the air, there are borderline situations in which the frost can migrate from freezer door, or other similar freezer surfaces upon which frost collects when the freezer door is opened, to the frost attractor even though at some periods in operation the air temperature may be the same or very slightly greater than the actual temperature of the surfaces upon which the frost has collected.

Since the air surrounding the primary evaporator and cabinet surfaces must pick up any frost that does collect on those surfaces and transfer it to the frost attractor, it is clear that the air must itself move in a circulation pattern. This provision for circulation may take many forms and must, of course, vary with differing freezer cabinet designs. While in some instances the temperature differential between the frost attractor and the remainder of the cabinet is sufficient to cause satisfactory circulation without making special provision for such circulation, ordinarily it will be found desirable to provide special paths or shelf arrangement for it. Such arrangements will be discussed specifically in connection with the description of Figure 6, hereinafter.

Several control relationships may be provided for providing the temperature differential above described. In the present application, five preferred forms of refrigeration circuits are shown by way of illustration only and it will be apparent to those skilled in the art that additional circuits may effectively be used.

Figure 2:
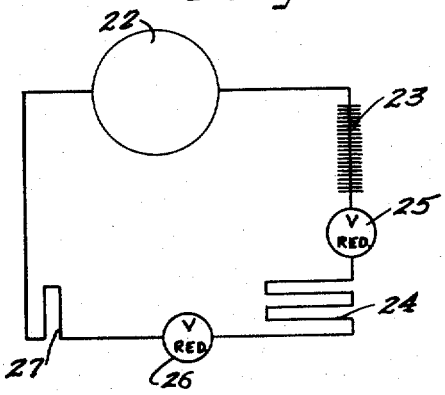
Figure 2 is a schematic diagram of a refrigeration circuit embodying a first form of the present invention.
Figure 3:
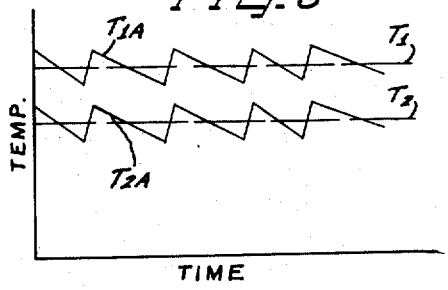
Figure 3 is a chart illustrating the operation of the circuit shown in Figure 2.

As shown in Figures 2 and 3, a restrictor type of system is utilized. Thus, the conventional compressor 22 compresses the refrigerant which is liquefied in the condenser 23 and evaporated in the evaporator 24 subsequent to passage through the conventional restricting valve 25. Instead of returning the refrigerant directly from the evaporator 24 to the compressor 22 as in conventional systems, however, a second restrictor 26 is provided downstream of the evaporator 24 and, additionally, a secondary or frost attracting evaporator 27 is positioned between the restrictor 26 and the compressor 22. As a result of the insertion of restrictor 26 the evaporator 24 operates at all times at a pressure somewhat higher than pressure in the secondary evaporator 27. Accordingly, refrigerant evaporates in the evaporator 27 at a lower temperature than the evaporator 24. Although not necessary, it is preferred, for efficient operating efficiency, that this operating differential remain substantially constant with changes in refrigeration load applied to the system by the addition of food to be frozen or the opening and closing of the freezer door. Although not shown in Figure 2, where the basic form of circuit is illustrated, a preferred means of providing this constant differential is discussed below in connection with Figures 6 and 7.

The operation of the above basic arrangement may more readily be understood from a consideration of Figure 3. As there shown, a graph in which temperature is plotted against time, shows an average operating temperature of $T_1$ for the primary evaporator 24 and a second average temperature $T_2$ for the secondary evaporator or frost attractor 27. The instantaneous temperatures of the evaporators 24 and 27 are shown by the lines $T_1A$ and $T_2A$ respectively and, as may be noted, the instantaneous temperatures vary substantially simultaneously as the freezer door is opened, material is inserted to be frozen or the freezer recycles from increase in temperature due to heat transfer through the insulation. At all times the temperature differential between $T_1$ and $T_2$ remains substantially constant and accordingly there will be a constant tendency for heat and frost to be transferred from the coil 24 to the frost attractor secondary evaporator 27.

As indicated above, however, in view of the fact that both of the evaporator coils 24 and 27 are substantially colder than atmospheric temperature, during daytime use of the freezer slight amounts of frost may accumulate on the evaporator 24 as the door is opened. However, during the night, when substantially no use is made of the freezer, any small amount of frost that may have accumulated on the evaporator 24 will migrate, as a result of the temperature differentials above discussed, to the frost attractor 27.

This may be improved, where desired, by providing means for increasing the pressure differential at night. Such a refinement is shown and described in connection with the more elaborate circuit of Figures 6 and 7.

Figure 4:
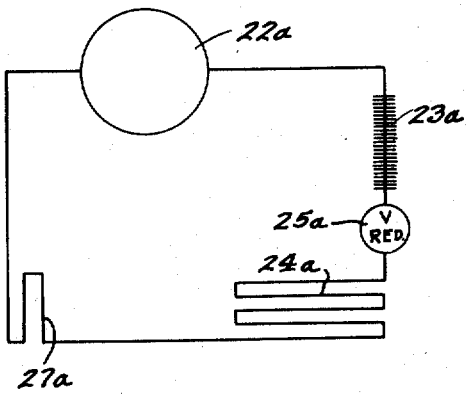
Figure 4 is a schematic diagram illustrating a modified form of the refrigeration circuit of the present invention.
Figure 5:
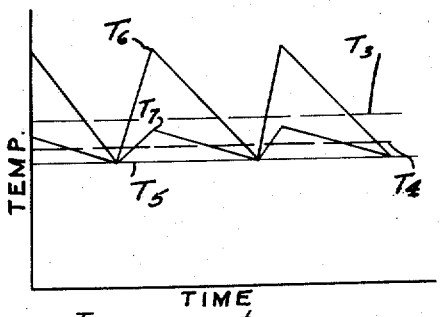
Figure 5 is a chart illustrating the operation of the modified circuit shown in Figure 4.

In Figures 4 and 5, a less desirable, but satisfactory, basic system is illustrated. There, the compressor 22a is connected to the condenser 23a which in turn directs liquid refrigerant through the restrictor 25a to the primary evaporator coils 24a. This much of the system is substantially identical to that described in connection with Figure 2. However, instead of utilizing a restrictor as at 26, the secondary or frost attracting coil 27a is constructed of a material having a greater specific heat than the material of the primary evaporator 24a. Alternatively, and providing the same effect, the coil 27a may be provided with substantially thicker walls, thereby providing a greater mass. In either case, however, the coil 27a will warm up more slowly during the off part of the compressor cycle than the primary evaporator coil 24a.

The result of the operation of the circuit shown in Figure 4 may be understood from a consideration of Figure 5. As is there shown, the average temperature $T_3$ is maintained at the refrigeration evaporator coils 24a and a lower temperature $T_4$ is maintained at the frost attracting evaporator coil 27a. Although the temperatures $T_3$ and $T_4$ are substantially different in ordinary use, both will be seen to vary from the same lowest temperature $T_5$ to different highest temperatures $T_6$ and $T_7$.

In view of the fact that no restrictor is provided between the coils 24a and 27a, both the primary and secondary evaporators operate at the same pressure and, accordingly, at the end of the running period of the compressor cycle the temperature of both coils would be substantially the same, namely $T_5$. Because the primary evaporator coil 24a warms up at a faster rate than the secondary coil 27a during this off portion of the compressor cycle, the former will reach a final temperature $T_6$ at the time the compressor starts to run, while in the same time interval the frost attracting coil will rise to a temperature of only $T_7$. Accordingly the average temperature $T_4$ will be lower than the average temperature $T_3$.

As described above, both of the circuits illustrated utilize a separate, substantially independent, secondary or frost attracting evaporator coil 27, 27a. By locating this coil at a point away from the main storage area in which the primary evaporator coils are positioned it is possible to defrost the entire freezer chest without disturbing the temperature of the stored food to any substantial degree. Thus, a conventional heating coil may be provided, as indicated at 30 in Figure 1, attached to the frost attracting coil 27 or 27a. When it is desired that the freezer be defrosted the compressor 22 is turned off and the heating coil 30 is rapidly heated with the result that the frost accumulated on the coil 27, 27a is very rapidly melted, after which it runs down the drain 19 to the pan 21.

In view of the fact that the frost in the freezer unit has substantially wholly attached itself to the coil 27, 27a as a result of the temperature differential described above, this localized defrosting actually has little effect on the temperature of the freezer chest as a whole. Accordingly, through the present system, defrosting may be accomplished without permitting any of the stored food to become momentarily slightly defrosted at the surface. As a result, food may be kept stored in the freezer constructed according to the present invention substantially indefinitely without damage. Further, as a result of the present system, no frost builds up on the freezer cabinet walls or shelves as in the conventional system, thereby providing a much neater appearance and eliminating the dispersion of frost and ice chips onto the floor surrounding the freezer during the removal of food therefrom.

As in the case of defrosting systems heretofore known, the electrical heating element 30 may be automatically controlled by a timer or, alternatively, may be operated manually by means of a switch 31. The specific structure of the heating element 30 is, of course, not considered a part of the present invention and it will be understood that various types of heating elements may be used without departing from the scope of the present invention. Further, it will be at once apparent to those skilled in the art that the relative size of the primary evaporator coil 24, 24a and the secondary or frost detracting coil 27, 27a may vary, depending upon the frequency of use of the freezer unit, and the capacity thereof. In freezers designed to be only infrequently loaded or opened, the temperature differential between the evaporators 24 and 27 may be a minimum and, likewise, the cooling capacity of the super cooled secondary evaporator 27, 27a may be minimized. As the intended use of the freezer increases, greater accumulation of frost must be handled and, accordingly, the temperature differential must be increased and/or, the cooling capacity of the evaporator 27, 27a increased.

While the above two described basic systems will perform in a generally satisfactory manner and will, accordingly, operate to provide a substantially frost free low temperature freezer unit, especially where the refrigeration loads are average, several refinements may be incorporated to improve the refrigeration efficiency. These improvements, by improving the efficiency of operation permit even extremely heavy duty, often used, freezer chests to remain frost free and at the same time to operate at little more, if any, cost than previously known non-front-free freezers.

Figure 7:
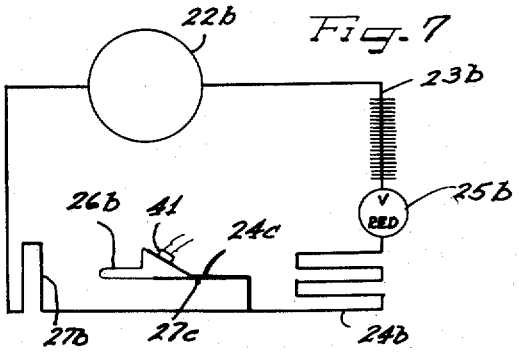
Figure 7 is a schematic diagram illustrating the circuit of the apparatus shown in Figure 6.

Such systems are illustrated in Figures 6, 7, 8 and 9. As shown in Figures 6 and 7, a compressor 22b and condenser 23b and evaporator valve or restrictor 25b, all of conventional nature, are provided. As above described in connection with the circuits of Figures 2 and 4, a main or primary evaporator 24b is provided and leads from the evaporator valve 25b, which is not shown in Figure 6 but which is positioned at the bottom of the refrigeration unit, to the evaporator coil which surrounds the liner 13b of the insulated cabinet 10b. After traveling about the liner, including all the wall surfaces thereof, the evaporator 24b continues along a path under the respective shelves 12b and the drip pan 32, as shown. From the drip pan the evaporator coil 24b extends to the portion 24c adjacent the frost attractor, or secondary evaporator 27b. The portion 24c is positioned in heat transfer relationship with the portion 27c of the secondary evaporator, and the two portions 24c and 27c are connected through a capillary tube 26b. As a result of the heat transfer relationship between the portions 24c and 27c, all of the refrigerant leaving the primary, or relatively high temperature evaporator portion is condensed by its contact with the low temperature portion 27c, immediately prior to entry into the capillary tube 26b. As a result of this condensation, a substantially constant pressure differential is maintained between the evaporator coils 24b and 27b and maximum efficiency is maintained in the compressor circuit since no gas will be introduced into the capillary tube 26 to magnify the restriction of the capillary tube and thereby cause an extremely low pressure in the secondary evaporator 27b, immediately prior to re-entry into the compressor. This constant pressure differential has proved extremely desirable and has permitted the use of standard size compressor structures while at the same time permitting incorporation of the frost-free feature.

Control of the refrigeration circuit and the defrosting element of the system shown in Figures 6 and 7 is extremely simple and effective. Ordinarily in the usual case of freezer units, a thermostatically responsive control is provided in the electrical circuit of the compressor for turning the compressor on after a load has been placed in the freezer compartment or, after the freezer compartment temperature has risen as a result of heat transmitted through the freezer cabinet. In addition to this conventional control, the present invention contemplates the provision of an electrical heating element 30b, positioned immediately under the evaporator coils 27b. At designated intervals, the compressor 22b is turned off and the heat element 30b is energized causing the frost on the evaporator coils 27b to melt into the drip pan 32 and from thence flow out through the condensate line 19b for disposal in the conventional manner described above. In view of the general isolation of the evaporator 27b from the remainder of the freezer, and its location in the top of the cabinet, this energization of the heating element 30b will not substantially affect the air temperature of the freezer as a whole.

As shown in Figure 6 the freezer cabinet is provided with a special air circulation control. Thus, with the components positioned as illustrated, the entire freezer cabinet will be cooled by the primary evaporator coils 24b and the secondary, low temperature, evaporator 27b will provide cooling below the temperature of the evaporator 24b. Accordingly, air leaving the surfaces of the secondary evaporator 27b will move downwardly. The drip pan 32 was provided with a high wall 33 at the rear of the cabinet and the side walls are secured to the liner 13b. As a result of this construction, the cool air flows off the front of the drip pan over the short wall 34 and downwardly between the main part of the cabinet and the cabinet door 35, along the path indicated by the arrows 36. Each of the shelves 12b is provided with an upwardly projecting back plate 12c similar to the wall 33 which is provided with an aperture at the top, as at 12d through which air warmed by contact with the relatively higher temperature frost, food, and shelves, may flow. Accordingly, when the freezer door 35 is opened and frost instantaneously collects on the adjacent surfaces of the shelves 12b, this natural air flow circuit permits the cold air flowing downwardly at 36 to move inwardly along the shelves 12b picking up the frost from the higher temperature shelves and to then move upwardly along the paths indicated by the arrows 37 back to the evaporator 27b.

Since, as those familiar with the art are concerned, the freezer door is subject to heavy frosting when open, because of its proximity to the surrounding, moisture laden air, it is desirable that the cool, low temperature, air be passed over the door at a fairly rapid rate in order to remove the frost rapidly. In the structure shown in Figure 6, separate air ducts 38 are provided between the door liner 39 and the door shelf backing 40. As a result of this arrangement a positive flow of air along the arrows 36 is provided, with a relatively friction free return 38.

The result of the above circulation arrangement is that cold air is constantly circulated from the frost attractor, secondary evaporator 27b downwardly along the relatively warm shelf surfaces, and along the likewise relatively warm door. As described above, since the air from the evaporator 27b is at a lower temperature than the shelves, it is accordingly at a lower dew point temperature, the frost on the shelves and packages will be evaporated into the air which will, upon recirculation to the evaporator 27b, cause the frost to be reprecipitated out on the frost attractor 27b.

While it will be apparent that a range of temperatures and pressures may be utilized in the refrigeration system above described, and that such variations will operate in a satisfactory manner to migrate attracted frost from the main freezer shelves to the frost attractor, as long as the dewpoint temperature of the air passing over the shelves is less than the temperature of the frost on the shelves, for purposes of illustration it is noted that the following operational temperatures have proved very satisfactory. During the day, a freezer adjusted to provide approximately 13° temperature differential between the evaporator 27b and the shelves 24b will in 90° ambient air temperature room, provide, when the evaporators 24b and 27b bear a 70–30 relationship, sufficiently cool air in the body of the freezer cabinet to maintain the dew point temperature of the air over the shelves 12b just slightly below the temperature of the shelves themselves. At night, when the freezer door is closed and the load on the unit is at its minimum this temperature differential may be substantially increased in the manner described below until a temperature differential of approximately 30° may be provided. With this substantially increased pressure temperature differential, any frost which may have accumulated during the day from repeated door openings, and which would only slowly be migrated to the frost attractor 27b with the smaller temperature differential, are quickly transferred. Preferably, a timer switch may be said to provide the change in temperature during a short nighttime period.

A simple and accordingly preferred method of controlling the temperature differential during the nighttime period above described is illustrated in Figures 6 and 7. As is there shown, a heating element 41 is placed against a projecting tubular portion of the evaporator section 24c, immediately prior to the point of connection with the capillary tube 26b. By heating up the tube section 24c as indicated the completely liquified refrigerant will be re-evaporated slightly, introducing gas into the system at the capillary. This will cause the capillary 26b to offer substantially greater resistance to the flow of refrigerant thereby causing a substantially increased pressure differential which in turn causes an increased temperature differential. By utilizing an electrical heater 41, a conventional electrical timer switch such as oftentimes used on ordinary defrosting systems may be utilized to control the heating of the element 41 for a few hours during the middle of the night. If desired, the same timer that controls the heating element 41 may be utilized to control the heating element 30b in such a manner as to energize the heating element 30b and turn off the compressor 22b immediately after de-energization of the heating element 41, thereby defrosting the freezer cabinet immediately after all of the frost has been migrated to the evaporator 27b.

It will, of course, be appreciated that a substantial temperature differential may be provided at all times during the day within the scope of the present invention. However, the increase of the temperature differential during the small hours of the night permits the system to operate on a smaller compressor and less electric power over all.

Figure 9:
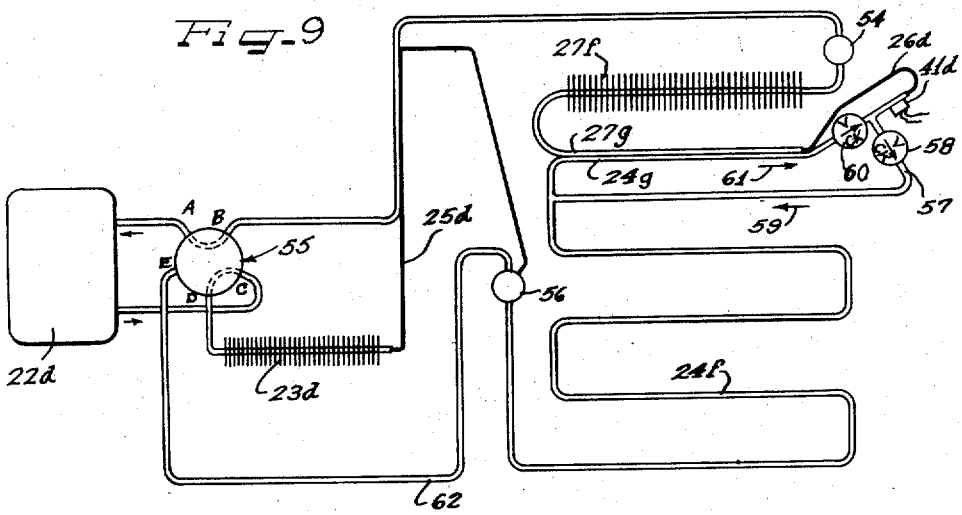
Figure 9 is a diagrammatic illustration of the invention utilizing a further modification of the defrosting mechanism.

In the systems above described, the secondary evaporator, or the "frost attractor" is heated by any conventional heating means such as an electrical resistance unit during a period when the compressor of the refrigerator system is de-energized. This arrangement has proved quite satisfactory for general use and is comparatively inexpensive from the point of view of construction costs. It will be understood, however, that various means may be utilized for heating the secondary evaporator 27. Two particularly satisfactory alternative arrangements are illustrated in Figures 8 and 9.

Figure 8:
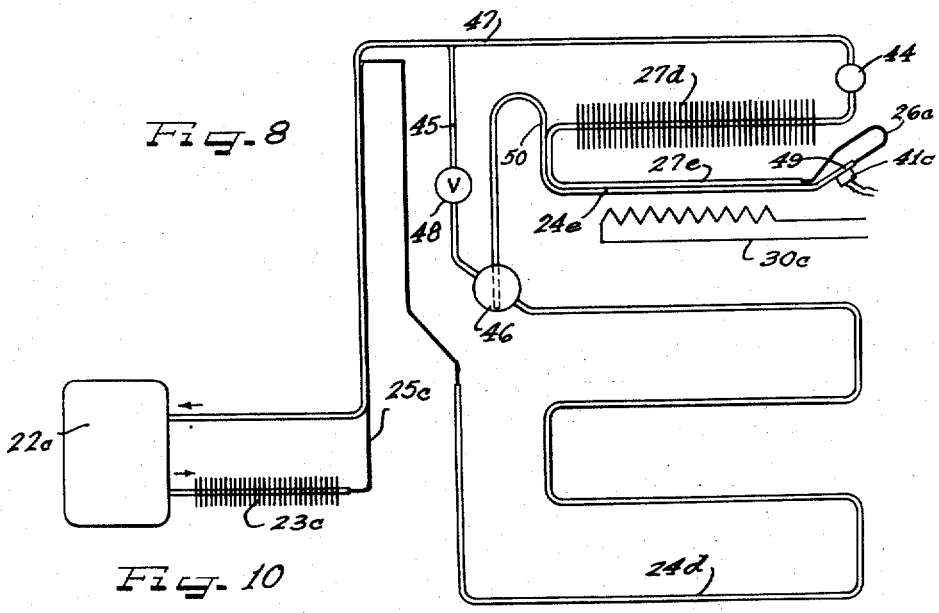
Figure 8 is a diagrammatic illustration of the invention using a modified form of defrosting cycle.

In Figure 8 a by-pass system is provided wherein operation of the compressor may be continued during the period in which the frost attractor is having the frost removed therefrom. As there shown, the compressor 22c, condenser 23c, restrictor 25c, primary evaporator 24d and secondary evaporator 27d are substantially identical to the corresponding elements shown in Figures 1 through 7. Likewise, the heating element 30c, the heat transfer structure 27e, 24e, and the frost attractor control restrictor 26c and heater 41c are substantially the same as heretofore discussed. However, instead of merely providing a switch for de-energizing the compressor 22c during the period when the frost attractor 27d is to be heated for defrost purposes a somewhat improved arrangement is provided wherein the primary evaporator 24d is cooled simultaneously with the heating of the secondary evaporator 27d.

The by-pass circuit arrangement comprises a by-pass conduit 45 connected to the exit end of the evaporator 24d prior to its heat transfer relationship with the inlet conduit of the evaporator 27d. This connection is shown at accumulator 46. The opposite end of the by-pass conduit 45 is connected as at 47 to the suction or return line between the compressor 22c and the conventional accumulator 44, and a by-pass valve 48 is inserted between the points 46 and 47. Preferably the valve 48 is electrically actuated by a conventional solenoid connected for energization simultaneously with energization of the heater element 30c.

In operation, when the period for defrosting the frost attractor 27d arrives, preferably subsequently to operation with the capillary control heater 41c, as described above, the heater 30c is energized and the valve 48 actuated into the open position. With the parts thus operating refrigerant will flow from the primary evaporator 24d directly to the compressor 22c through the by-pass 45. Refrigerant will not flow through the secondary evaporator 27d to any extent in view of the restrictor 26c and the refrigerant trap formed by the upstanding U defined by the conduit portions 49, 24e and 50. Accordingly, heat from the resistance element 30c will melt frost accumulated on the secondary evaporator 27d and at the same time the primary evaporator 24d will operate to maintain the refrigerated compartment in a cold state. In fact, in view of the fact that the pressure in the evaporator 24d will be reduced by the action of the by-pass connecting it directly to the compressor 22c, the evaporator 24d will operate at a substantially lower temperature than its ordinary range of operation and will assure the maintenance of the refrigerated compartment at a satisfactory low level.

In Figure 9, still a further system for melting frost accumulated on the secondary evaporator or frost attractor is provided. As there illustrated, and with the parts aligned as shown, a compressor 22d delivers refrigerant to condenser 23d through a reversing valve 55 and receives refrigerant for compression from the secondary evaporator 27f likewise through the reversing valve 55. The condenser 23d delivers refrigerant through the restrictor 25d to the primary evaporator 24f through accumulator 56 and as in the systems described in Figures 1 through 8, refrigerant leaves the primary evaporator 24f through a portion 24g in heat transfer relationship with the inlet portion 27g of the secondary evaporator 27f. Likewise as in the earlier cases, the control heater 41d and restrictor 26d are provided and operate in the manner described above. A reversing by-pass conduit 57 is provided for reverse operation to be described below and is provided with a check valve 58 which permits flow through the conduit 57 only in the direction of the arrow 59. A check valve 60 is provided in the outlet 24g of the evaporator 24f and permits refrigerant flow only in the direction of the arrow 61. A second by-pass reversing conduit 62 is provided for connecting point 56 to the reversing valve 55 thereby by-passing the condenser 23d and restrictor 25d during reverse operation to be described below.

When it is desired to heat the secondary evaporator or frost attractor 27f under the system shown in Figure 9, the condenser 23d is eliminated from the system and the secondary evaporator 27f is converted into the condenser for the refrigerant system. This is accomplished by actuating the reversing valve 55 in the counterclockwise direction into the reverse position shown in Figure 10. In this reverse position, the compressor 22d delivers compressed refrigerant to the secondary evaporator 27f through aligned ports C and B of valve 55 and accumulator 54 while the normal condenser 23d connected to the valve 55 at the conduit port D is completely shut off. Refrigerant returns to the compressor 22d from the primary evaporator 24f through the reverse by-pass conduit 62 through the aligned ports A, E of the valve 55. Thus, compressed refrigerant flows to the secondary evaporator or frost attractor 27f which then operates as a condenser removing heat from the refrigerant. Condensed refrigerant then flows through the restrictor 26d and through the check valve 58 and by-pass conduit 57 to the primary evaporator 24f which operates conventionally as an evaporator. The refrigerant then flows back to the compressor 22d via the accumulator 56 and conduit 62 by-passing the usual condenser 23d and restrictor 25d.

Figure 10:
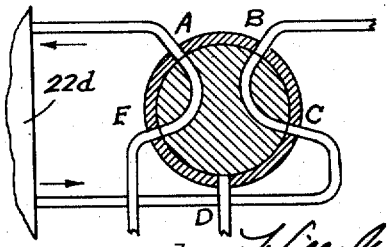
Figure 10 is a view of the reversing valve shown in Figure 9 in a reverse position.

With the system shown in Figures 9 and 10, no electrical heating element whatever is required for removing the frost from the secondary evaporator 27f and at the same time the primary evaporator 24f operates during the defrost period thereby providing an extremely efficient system.

It will, of course, be understood that the reversing valve 55 may be actuated by an electrical solenoid energized by the usual control timer, again preferably after a period of operation in the usual or "forward" manner with the control heater 41d in operation to provide a maximum attraction of frost to the evaporator 27f.

While three defrost arrangements have been discussed above, it will be understood that the present invention contemplates the use of substantially any equivalent defrosting arrangement. For example, it is contemplated that the refrigerant entering the secondary frost attractor 27 could be heated by an electrical heater element rather than by placing such a heater element beneath the secondary evaporator as shown in Figure 6. Such an arrangement would permit the efficient heat transfer of the heat energy from the refrigerant gas to the frost on the frost attractor through the fins of the latter. Another alternative arrangement is to by-pass the condenser 23 and the main restrictor capillary 25 and operate the secondary evaporator 27 as a condenser permitting condensed refrigerant to proceed immediately back to the compressor. This latter system would connect the outlet of the compressor 22 directly to the inlet, for example 27a of the secondary evaporator 27.

While the system herein described is to be applied mainly to low temperature freezers in which temperatures are maintained below freezing throughout, it will be appreciated that the frost attractor herein disclosed may be used in a food refrigerator wherein the conventional ice cube compartment is to be used for meats or other foods and wherein an increase in its temperature above freezing is not desired.

It will thus be seen that we have provided a novel and very useful improvement in freezer cabinets which is not only extremely effective but which may be included in conventional freezers with a minimum of additional cost. Although two embodiments of the present invention have been illustrated it will be understood that variations and modifications may be made to the refrigeration circuits in accordance with the present invention without departing from the scope of the novel concepts herein above set forth. It is therefore my intention that the scope of the present invention be limited solely by the appended claims.

We claim as our invention:

1. In a refrigerator, a cabinet providing a storage compartment closed to the atmosphere and having a front opening, a primary evaporator effective for maintaining the space within said compartment at a predetermined storage temperature, a door normally closing said opening and providing a side wall of said compartment, a plurality of spaced shelves in said compartment spaced inwardly from said door and with the front of the spaces therebetween substantially unobstructed, a drip pan overlying said shelves and spaced inwardly from said door and substantially unobstructed at its front, said shelves having upwardly extending back walls of material height less than the spacing of said shelves and said drip pan having an upwardly extending back wall of material height, said back walls of said shelves and drip pan being spaced away from the back wall of said compartment, a secondary evaporator overlying said drip pan and disposed substantially within the height of said back wall thereof, and means for maintaining said secondary evaporator at a temperature below freezing and lower than said predetermined storage temperature.

2. In a refrigerator, a cabinet providing a storage compartment closed to the atmosphere and having a front opening, a primary evaporator effective for maintaining the space within said compartment at a predetermined storage temperature, a door normally closing said opening and providing a side wall of said compartment, shelving on said door comprising a backing spaced inwardly from the inner face of said door defining therewith an air flow passage opening into said compartment adjacent the top and the bottom thereof, a plurality of spaced shelves in said compartment spaced inwardly from said shelving and with the front of the spaces therebetween substantially unobstructed, a drip pan overlying said shelves and spaced inwardly from said shelving and substantially unobstructed at its front, said shelves having upwardly extending back walls of material height less than the spacing of said shelves and said drip pan having an upwardly extending back wall of material height, said back walls of said shelves and drip pan being spaced away from the back wall of said compartment, a secondary evaporator overlying said drip pan and disposed substantially within the height of said back wall thereof, and means for maintaining said secondary evaporator at a temperature below freezing and lower than said predetermined storage temperature.

3. In a refrigerator, a cabinet providing a storage compartment closed to the atmosphere and having a front opening, a primary evaporator effective for maintaining the space within said compartment at a predetermined storage temperature, a door normally closing said opening and providing a side wall of said compartment, shelving on said door comprising a backing spaced inwardly from the inner face of said door defining therewith an air flow passage opening into said compartment adjacent the top and the bottom thereof, a plurality of spaced shelves in said compartment spaced inwardly from said shelving and with the front of the spaces therebetween substantially unobstructed, a drip pan overlying said shelves and spaced inwardly from said shelving and substantially unobstructed at its front, said shelves having upwardly extending back walls of material height less than the spacing of said shelves and said drip pan having an upwardly extending back wall of material height, said back walls of said shelves and drip pan being spaced away from the back wall of said compartment, a secondary evaporator overlying said drip pan and disposed substantially within the height of said back wall thereof, means for maintaining said secondary evaporator at a temperature below freezing and lower than said predetermined storage temperature, and means for optionally heating said secondary evaporator to a temperature above freezing.

4. In a refrigerator, a cabinet providing a storage compartment closed to the atmosphere and having a front opening, a primary evaporator effective for maintaining the space within said compartment at a predetermined storage temperature, a door normally closing said opening and providing a side wall of said compartment, shelving on said door comprising a backing spaced inwardly from the inner face of said door defining therewith an air flow passage opening into said compartment adjacent the top and the bottom thereof, a plurality of spaced shelves in said compartment spaced inwardly from said shelving and with the front of the spaces therebetween substantially unobstructed, a drip pan overlying said shelves and spaced inwardly from said shelving and substantially unobstructed at its front, said shelves having upwardly extending back walls of material height less than the spacing of said shelves and said drip pan having an upwardly extending back wall of material height, said back walls of said shelves and drip pan being spaced away from the back wall of said compartment, a secondary evaporator overlying said drip pan and disposed substantially within the height of said back wall thereof, means for maintaining said secondary evaporator at a temperature below freezing and lower than said predetermined storage temperature, and heating means overlying said drip pan at the upper face thereof below said secondary evaporator for optionally heating the latter to a temperature above freezing.

*5. In a food freezer, a cabinet providing a storage compartment closed to the atmosphere and having a front opening, a door normally closing said opening and providing a side wall of said compartment, a plurality of vertically spaced shelves disposed throughout said compartment and spaced inwardly from said door and from the top and bottom of said compartment with the front of the spaces between said shelves substantially unobstructed, a primary evaporator having at least a portion thereof in direct heat exchange relation with said shelves and effective to maintain said shelves and the space within said compartment at a predetermined storage temperature below freezing, means to defrost the exposed surfaces of said compartment, door, shelves and primary evaporator, said means including upwardly extending backwalls on said shelves a height less than the spacing of said shelves and spaced away from the backwall of said compartment to form with the latter and with the*

*top of said compartment a duct for circulation of compartment air therethrough and through the spaces between said shelves and the space between said door and shelves, a secondary evaporator so disposed within said duct as to be contacted by substantially all of the air passing therethrough and operable during operation of said primary evaporator at a temperature lower than said predetermined storage temperature, and means for optionally heating said secondary evaporator.*

References Cited in the file of this patent or the original patent

UNITED STATES PATENTS

| | | |
|---|---|---|
| 2,327,672 | Schweller | Aug. 24, 1943 |
| 2,370,267 | Starr | Feb. 27, 1945 |
| 2,442,978 | Jones | June 8, 1948 |
| 2,444,593 | Davis | July 6, 1948 |
| 2,462,240 | Van Vliet et al. | Feb. 22, 1949 |
| 2,487,182 | Richard | Nov. 8, 1949 |
| 2,622,405 | Grimshaw | Dec. 23, 1952 |
| 2,662,380 | Sutton | Dec. 15, 1953 |
| 2,712,732 | McGrew | July 12, 1955 |
| 2,728,198 | Schumacher | Dec. 27, 1955 |
| 2,767,558 | Wallenbrock | Oct. 23, 1956 |
| 2,769,311 | Duncan | Nov. 6, 1956 |
| 2,773,355 | Doeg | Dec. 11, 1956 |